May 30, 1939.　　　　F. M. BENTALL　　　2,160,409
CONTROL FOR AIR FLOW TO UNDERFEED STOKERS
Filed Aug. 12, 1935　　　3 Sheets-Sheet 1
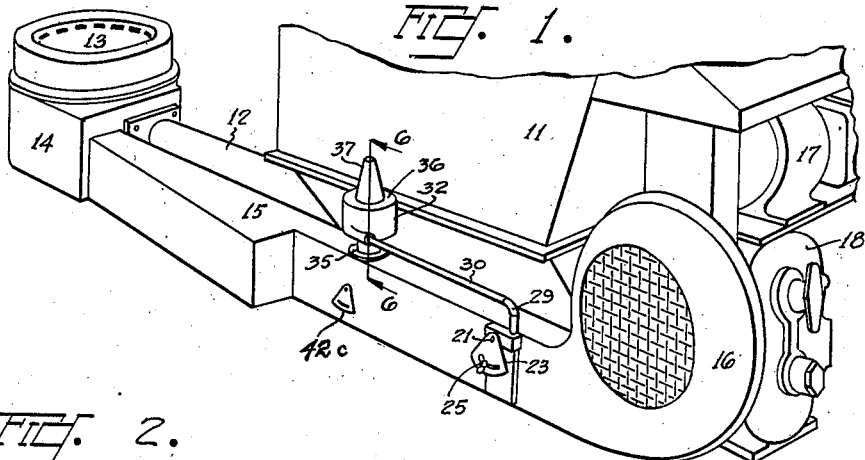
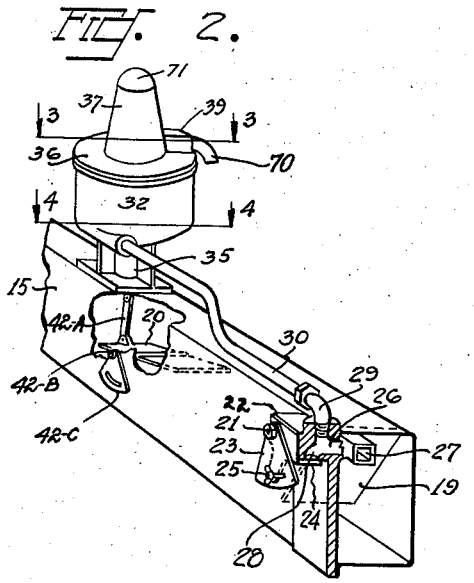
INVENTOR
F. M. BENTALL
BY
ATTORNEY May 30, 1939.   F. M. BENTALL   2,160,409
CONTROL FOR AIR FLOW TO UNDERFEED STOKERS
Filed Aug. 12, 1935   3 Sheets-Sheet 2
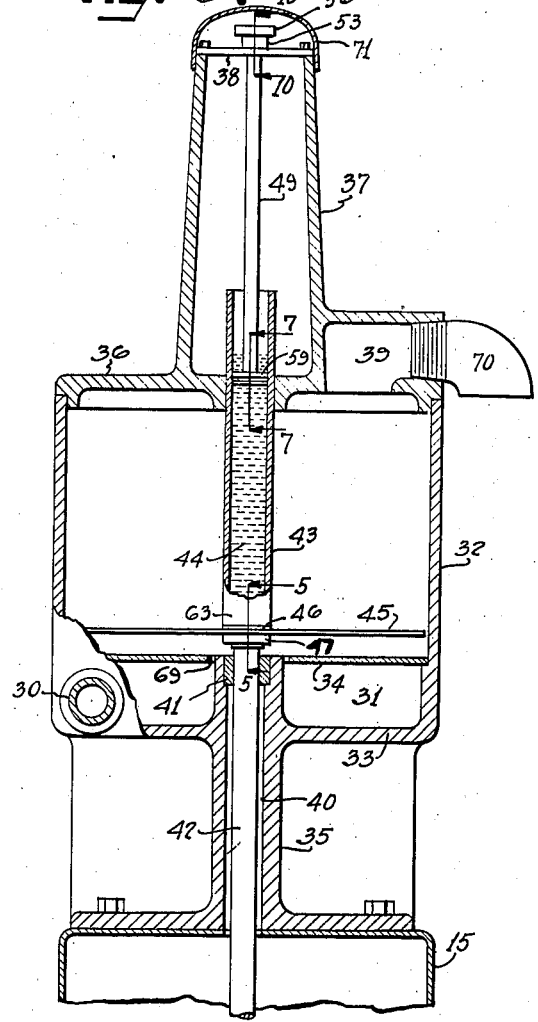
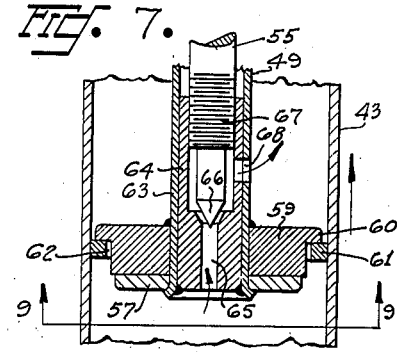
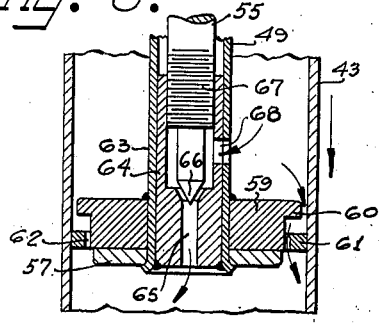
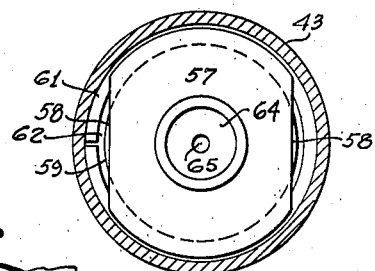
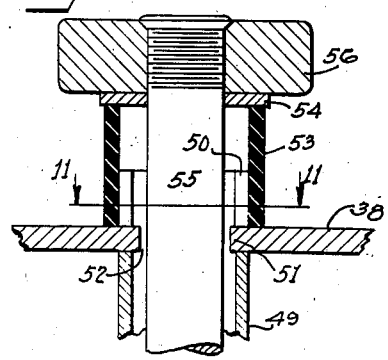
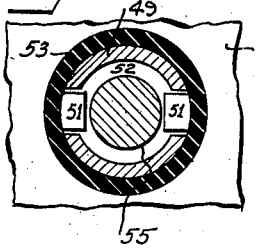
INVENTOR
F. M. BENTALL
BY
ATTORNEY

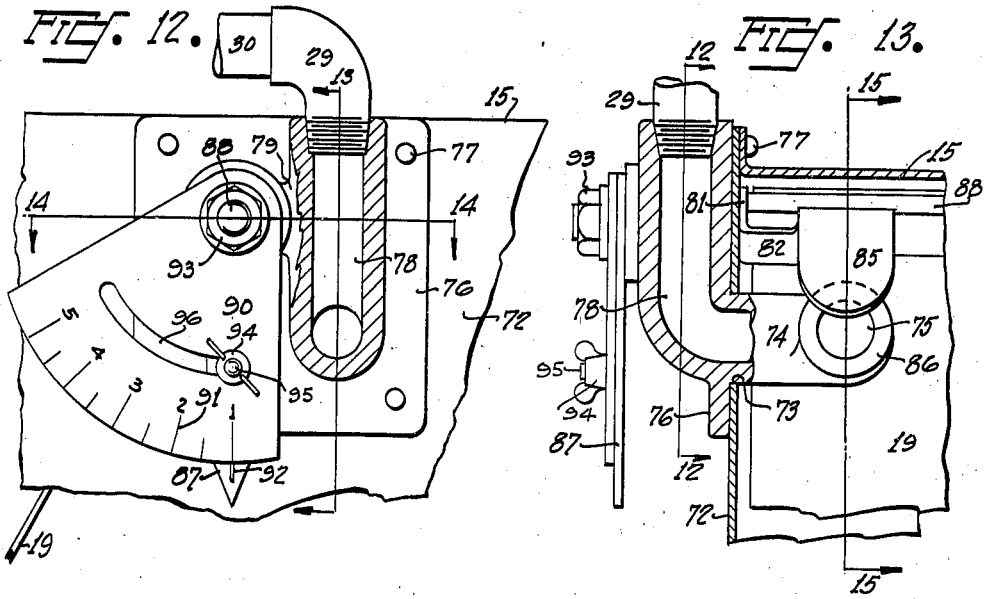
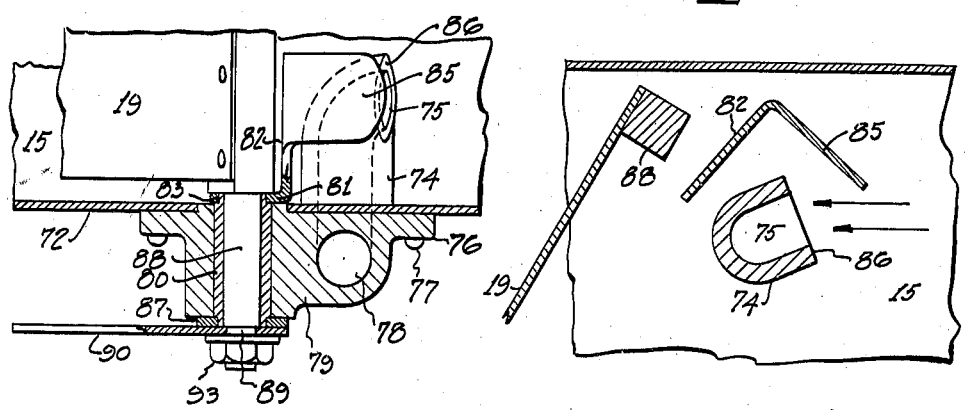
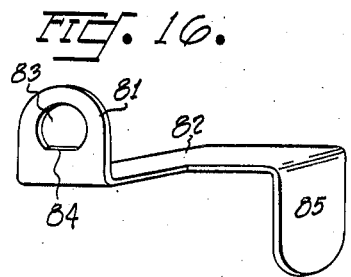

Patented May 30, 1939

2,160,409

UNITED STATES PATENT OFFICE 2,160,409

CONTROL FOR AIR FLOW TO UNDERFEED STOKERS

Frank M. Bentall, Portland, Oreg., assignor to Iron Fireman Manufacturing Company, Portland, Oreg.

Application August 12, 1935, Serial No. 35,895

4 Claims. (Cl. 137—153)

This invention relates generally to underfeed stokers and particularly to controls for the air supplied thereby.

The main object of this invention is the provision of a new form of control which will insure a uniform and constant volume of air flowing through the air duct of the stoker during the entire time fuel is being fed by the stoker.

The second object is to provide a means for protecting the device against being rendered inoperable by the presence of dust in the pneumatic portion of the device.

The third object is to provide a means for offering a different amount of resistance to the opening and closing movements of the damper mechanism and to provide a convenient means for varying the relation between the amounts of resistance offered to the operating movements.

These, and other objects, will become more apparent from the specification following as illustrated in the accompanying drawings, in which:

Fig. 1 is a perspective view of a stoker showing the external parts of the device.

Fig. 2 is a fragmentary view of the air duct showing portions broken away to disclose the parts of the control.

Fig. 3 is a horizontal section taken along the line 3—3 in Fig. 2.

Fig. 4 is a horizontal section taken along the line 4—4 in Fig. 2.

Fig. 5 is a fragmentary section taken along the line 5—5 in Fig. 6.

Fig. 6 is a section taken along the line 6—6 in Fig. 1.

Fig. 7 is a section showing the position of the parts when the damper is opening.

Fig. 8 is a view similar to Fig. 7 showing the position of the parts while the damper is closing.

Fig. 9 is a section taken along the line 9—9 in Fig. 7.

Fig. 10 is a section taken along the line 10—10 in Fig. 6.

Fig. 11 is a section taken along the line 11—11 in Fig. 10.

Fig 12 is a fragmentary side elevation of a modified form of air controlling valve with a portion thereof broken away in section along the line 12—12 in Fig. 13.

Fig. 13 is a section taken along the line 13—13 in Fig. 12.

Fig. 14 is a section taken along the line 14—14 in Fig. 12.

Fig. 15 is a section taken along the line 15—15 in Fig. 13.

Fig. 16 is a perspective view of the closure portion of the valve illustrated in Figs. 13 to 15, inclusive.

Similar numbers of reference refer to similar parts throughout the several views.

Referring in detail to the drawings, there is shown a stoker consisting of a hopper 11 which communicates by means of a coal tube 12 with a tuyere section 13, which is mounted over an air box 14 which forms the plenum chamber of the stoker.

Communicating with the air box 14 is an air duct 15 to which air is supplied by a fan within the casing 16. The fan within the casing 16 is driven by a motor 17 which also drives the coal delivery worm within the tube 12 through the transmission contained in the casing 18.

The apparatus thus far described is common to stokers now in use.

Referring particularly to my invention, same will be seen to consist of a pilot vane 19 and a control damper 20, the actions of which are correlated as produced by the mechanism more fully set forth in the co-pending application of Haskell C. Carter, Serial Number 4,945, over which this device is an improvement.

The pilot vane 19 is hinged on a pivot bolt 21 which journals in the support 22 and has secured on its outer end a valve arm 23, which may be clamped to the angle bar 24, which is also pivoted on the pivot bolt 21 by means of the clamping screw 25. The support 22 has a recess 26 therein having an inlet 27 which faces the discharge of the fan within the casing 16. The recess 26 also has an outlet 28 which faces the angle bar 24, which serves as a closure for the outlet 28 when the vane 19 is in its lowermost position.

The recess 26 is connected by means of an outlet elbow 29 to the air pipe 30, which extends tangentially into the compartment 31 which is formed in the lower end of the cylinder 32 between its bottom 33 and the floor plate 34. Compartment 31 constitutes a dust collecting chamber. The cylinder 32 is supported on the standard 35 which is secured upon the air duct 15. Across the top of the cylinder 32 is placed a head 36 upon which is formed a well 37 which is closed by the cap 38. An exhaust opening 39 communicates between the interior of the cylinder 32 and the atmosphere.

Within the standard 35 is formed the upright opening 40 within the upper end of which opening 40 is placed a bushing 41 in which is slidably mounted a piston rod 42 which is slidable within the bushing 41. The lower end of the piston rod 42 is joined by means of a connecting link 42A to the control damper 20 which is pivotally mounted on the shaft 42B and carries on its outer end a slotted arm 42C. The purpose of the slotted arm 42C will not be explained here as it has been elaborated upon in the co-pending application before referred to. The upper end 43 of the piston rod 42 is in the form of a tube which contains a suitable fluid 44 having a fairly uniform viscosity through a wide range of temperatures.

On the lower end of the tubular portion 43 is mounted a sheet metal piston 45, which is loosely held between the shoulder 46 on the portion 43 and the collar 47 on the portion 48 of the piston rod 42, the purpose being to make the piston 45 self-centering and incapable of binding with relation to the interior of the cylinder 32.

Within the tubular end 43 is disposed a stationary piston rod 49 whose upper end 50 is slotted to receive the lug 51 of the opening 52 in the cap 38 of the well 37. Around the projecting end 50 of the piston rod 49 is placed a piece of resilient tubing 53 upon which is placed a washer 54. Projecting downwardly through the washer 54 is a stem 55, which has secured upon its upper end a knurled head 56. At the lower end of the rod 49 is secured a washer 57 whose sides 58 are cut away as shown in Fig. 9.

Secured upon the rod 49 against the washer 57 is a flanged piston 59 beneath whose flange 60 is placed a ring 61 which engages the inside of the tubular portion 43. There is a considerable amount of clearance between the flange 60 and the washer 57, permitting a relative movement between the piston 59 and the ring 61, and due to the clearance space 62 between the ring 61 and the piston 59 and the clearance between the flat sides 58 and the tube 43, the piston 59 acts as a check valve, permitting a restricted flow of the fluid in a downward direction when the tubular end 43 moves downwardly as shown in Fig. 8, that is, in a damper closing direction and a more restricted flow of fluid in a damper opening direction.

Within the lower end 63 of the rod 49 is placed a valve plug 64 having an opening 65 which is controlled by the valve point 66 formed on the threaded lower end 67 of the stem 55. A port 68 communicates between the interior of the plug 64 and the exterior of the rod 49.

It can be seen from the foregoing that in the normal operation of the stoker air is delivered from the fan casing 16 to the duct 15 while fuel is being delivered from the hopper 11 through the coal tube 12 to the tuyere section 13. At the commencement of a stoker operation the pilot vane 19 is in a lowermost position, which it has reached by the action of gravity. As the pressure within the fan casing 16 and the vane 19 rises, air enters the inlet 27 and flows through the clearance 69 to the under side of the piston 45 which is caused to rise by this action, carrying with it the piston rod 42 and opening the control damper 20. At the same time, the tubular upper end 43 of the piston rod 42 rises causing the parts to assume the position shown in Fig. 7, imposing a maximum amount of resistance to the passage of fluid 44 and offering a retarding action to the opening movement of the damper 20, which is of course, desirable.

As the air passes through the pipe 30 into the compartment 31, the centrifugal action separates the solids therefrom so that only clean air can pass upwardly into the operating cylinder 32, thereby insuring the best operation thereof.

Obviously, the air displaced by the piston 45 escapes to the atmosphere through the exhaust fitting 70.

It can be seen that an adjustment is provided whereby the amount of restriction imposed on the movements of the damper 20 can be easily varied by adjusting the knurled head 56. In actual practice, it is desirable to provide a hood 71 over the knurled head 56 to prevent same from being accidentally moved.

In the form of the device shown in Figs. 12 to 16, inclusive, the air duct 15 is provided with a cover plate 72 provided with an opening 73 through which extends the body 74 of an air inlet opening 75 which preferably faces the fan casing 16. The body 74 is provided with a flange 76 and is secured to the plate 72 by the rivets 77. The body 74 extends upwardly outside of the flange 76, and its opening 78 communicates between the inlet 75 and the outlet elbow 29, which connects with the air pipe 30.

Journalling in the upright portion 79 of the body 74 is a bushing 80 on whose innermost end is secured the end 81 of the closure portion 82 of the valve. The end 81 is provided with an opening 83 having one flat side 84 which engages a corresponding side on the bushing 80. The member 82 is provided with a down turned end 85 which is substantially normal to the end 81. The end 85 can occupy a position directly against the face 86 of the inlet 75 when the bushing 80 is sufficiently rotated.

On the outermost end of the bushing 80 is secured an indicator arm 87. Extending through the bushing 80 is a shaft 88 on whose inner end is secured the pilot vane 19 and on whose shouldered outer end 89 is secured a valve arm 90 which is provided with graduations 91 which may be brought into register with the indicator 92 on the indicator arm 87. The relative position of the valve arm 90 and the indicator arm 87 can be adjusted and fixed by means of the nut 93 on the outer end of the shaft 88. The foregoing construction permits the control of the air utilized to operate the piston 45 at the point of inlet rather than at the point of outlet as in the first described form of the device, tending thereby to reduce the amount of air which passes into the control valve and thereby overcoming the tendency to whistle, which is a characteristic of the first described form of the device under certain conditions.

I claim:

1. A regulator for controlling the flow of air consisting of a cylinder having a vertical axis and having an air cleaning compartment at the lower end thereof to which air may be admitted tangentially, a piston rod slidably extending through said cylinder, said piston rod having a sheet metal piston loosely mounted on said rod and spaced from said cylinder, the upper end of said rod being tubular in form and provided with a liquid, a stationary piston mounted in said tube having a check valve therein adapted to offer unequal resistance to the passage of liquid around said last mentioned piston.

2. A regulator for controlling the flow of air consisting of a cylinder having a vertical axis, having a floor plate disposed at the bottom thereof adapted to form a dust collecting chamber from which air can escape into the upper portion of said cylinder, a piston rod extending through said cylinder having a piston mounted thereon spaced from the side walls thereof, said piston rod having a tubular oil filled portion, a piston valve mounted in said tubular portion adapted to offer different degrees of restriction to the flow of liquid through said piston valve during upward and downward movement of said tube and means for varying the relative amounts of restriction offered by said piston valve.

3. In a device of the class described a combination of an upright cylinder having a dividing floor plate near the bottom thereof, said floor plate forming the cover of a dust collecting chamber through the center portion of which air can escape into the upper end of the cylinder, means for admitting air tangentially into said dust collecting chamber, a piston rod extending through said cylinder the lower end of which rod is attached to a damper for controlling the flow of air through a duct, the upper end of said rod having a dash pot formed therein adapted to offer different amounts of restriction to the flow of liquid in different directions of travel, means for varying the amount of restriction, means for permitting the escape of air from said cylinder and a piston mounted on said rod near the lower end of said cylinder.

4. In a device of the class described a pneumatic cylinder characterized by having a piston provided with a piston rod extending therethrough one end of which is connected to a regulating damper and the other end of which is provided with a dash pot including a stationary piston provided with a check valve, means for admitting air to the underside of said first mentioned piston and means for permitting the escape of air from the upperside of said piston.

FRANK M. BENTALL.